Patented Nov. 27, 1945

2,389,693

UNITED STATES PATENT OFFICE 2,389,693

PROCESS FOR PRODUCING HIGH MOLECULAR WEIGHT POLYMERS FROM OLEFINS

William J. Sparks, Cranford, and Robert M. Thomas, Union, N. J., assignors, by mesne assignments, to Jasco, Incorporated, a corporation of Louisiana No Drawing. Application October 3, 1940, Serial No. 359,598

20 Claims. (Cl. 260—93)

The present invention relates to improvements in processes for producing high molecular weight polymers, and it relates particularly to catalysts for the low temperature polymerization of iso-olefins, diolefins and mixtures thereof, such as isobutylene, isoamylene, butadiene, mixtures of isobutylene with butadiene, with isoprene, with pentadiene, with dimethylbutadiene, and similar olefinic, isoolefinic and diolefinic substances, both singly and in admixture.

This application is a continuation-in-part of our application Serial No. 167,532 filed October 6, 1937, for a "Process for producing high molecular weight polymers from olefins."

Olefins, particularly iso-olefins, are polymerized to high molecular weight gummy materials of from viscous to solid consistency by the use of the Friedel-Crafts type catalysts such as boron fluoride and the like, while using low temperatures, below —10° C. and preferably as low as —80° to —100° C. Heretofore, boron fluoride has been preferred because it is gaseous, readily handled and more soluble than the solid halides of the class mentioned above. Aluminum chloride and other common halide catalysts are not sufficiently soluble in the iso-olefins to be polymerized at temperatures below —10° C. or in saturated hydrocarbon diluents, to give polymers of very high molecular weights, in spite of the fact that aluminum chloride is generally considered to be the most active polymerization catalyst of the Friedel-Crafts type.

The present invention is based upon the discovery that aluminum chloride will dissolve in various organic solvents, apparently as simple solutions, with no detectable stable complex; and when in such solutions, they show particularly powerful catalytic effects at low temperatures. The invention may utilize active halide catalysts other than aluminum chloride, particularly aluminum bromide as well as various other of the metal and metalloid halides.

It has been desired to find suitable solvents which will bring the more active metal halide catalysts of the Friedel-Crafts type into solution at the low temperatures required for polymerization. The metal halides contemplated are the solids such as aluminum chloride, bromide, iodide, the zirconium halides and the like.

These substances are representative of Friedel-Crafts type catalysts, of which the entire list of available Friedel-Crafts type catalysts is well shown in the article by N. O. Calloway under the title of "The Friedel-Crafts synthesis" printed in the issue of "Chemical Reviews" published for the American Chemical Society at Baltimore in 1935 in volume 17, No. 3, the article beginning on page 327, the list being particularly well shown on page 375.

Organic diluents or solvents for such materials have been suggested before for use at elevated temperatures or ordinary room temperatures, but those suggested in the prior art are not satisfactory for the low temperatures used in the present process. In the case of chemically saturated aliphatic hydrocarbon solvents, the solubility of the active metal halide becomes so slight at low temperatures that little or no catalytic activity is obtained. In other cases, complexes are formed which are found to be inactive or solidify at the necessary low polymerization temperatures. For example, the complexes formed with alcohols, ethers, aromatic hydrocarbons or their chlorinated derivatives are quite inactive as catalysts for low temperature polymerization, although some remain liquid even to low temperatures. In other cases, of which the nitro hydrocarbons, both aromatic and aliphatic, are examples, the complex is found to solidify at the desired polymerization temperatures, and for all of these reasons the solvents which can be used have been found to be extremely limited.

One of the best solvents for the solid catalysts for this purpose is found to be carbon disulfide. This material seemingly does not form a complex with Friedel-Crafts type catalysts such as aluminum chloride or bromide, but whether it is merely a simple solvent or forms a supersaturated or other type of solution is unknown at the present time, but the fact remains that the active metal halide is dissolved and a sufficient quantity is capable of being obtained in solution even at temperatures as low as —100° C., and that polymerization is actively promoted with such material to produce high molecular weight polymers. This is quite unexpected in that sulfur or sulfur-containing materials are generally considered poisons for the specific polymerization of olefins at low temperature, but carbon disulfide appears to be an exception in that it has no deleterious effect on the reaction.

The catalyst according to this invention is applicable to simple isobutylene alone at temperatures ranging from —10° C. downward to —100° C. or even lower for the production of the simple polymer of isobutylene by the addition of the cooled catalyst to the liquid isobutylene; or it may be used with mixtures of isobutylene and a diluent-refrigerant such as liquid propane, liquid ethane, liquid ethylene, and similar inert diluent refrigerants or with liquid isobutylene cooled by solid carbon dioxide with, or without, an inert diluent. It is similarly applicable to the simple diolefins either alone, or in solution in suitable solvents or diluent refrigerants such as methyl chloride or the above-mentioned diluent refrigerants.

The catalyst is particularly applicable to the polymerization of olefinic mixtures for the production of interpolymers, the molecules of which are made up of the mixed olefinic materials. Thus, it is particularly applicable to mixtures of isobutylene and butadiene; or mixtures of isobutylene and isoprene; mixtures of isobutylene and pentadiene; mixtures of isobutylene and dimethyl butadiene and similar mixtures of iso-olefinic and diolefinic substances including 3-methylbutene-1, the various other branched chain amylenes, the various isohexylenes, hexadienes, heptadienes, and the like.

The cataylst is particularly valuable with simple isobutylene at moderately low temperatures, since the high catalytic power of the dissolved active halide results in a higher molecular weight polymer than is otherwise obtainable at the same low temperature; and it is especially and outstandingly valuable for the polymerization of olefinic mixtures to produce interpolymers, since the diolefinic substances are in general more difficult to polymerize and copolymerize than is an iso-olefin such as isobutylene when treated at low temperatures as described above. Thus, when boron trifluoride is applied in the usual way to a mixture of isobutylene and butadiene by bubbling the boron trifluoride through the mixture as has been found necessary, the resulting polymer does not show a molecular weight above about 5,000, whereas by the use of the present catalyst on a similar mixture, interpolymers of the two reactants are obtainable having molecular weights ranging from 20,000 to 100,000, to 150,000, or even higher, depending upon the temperature, the catalyst concentration, the purity of the reactants and similar factors. These high molecular weight polymers show the unexpected and very valuable property of reactivity with sulfur to "cure" the material and to develop in it a high tensile strength, a definite elastic limit and a high flexure and abrasion resistance.

The polymerization may be carried out in any well known manner; for example, the catalyst may be dissolved with carbon disulfide and may be directly added to a reaction vessel containing the iso-olefin to be polymerized. The reaction vessel should be cooled because the reaction is vigorous and large quantities of heat are evolved so that the temperature will rise rapidly if precautions are not taken. Chilling may be external, but it is preferably internal, and may be accomplished by the addition of solid carbon dioxide to the reaction mixture, but the preferred method is to provide a sufficient volume of a substantially inert hydrocarbon diluent such as liquid propane, liquid butane or a mixture of these materials, with or without liquid ethane or liquid ethylene. By predetermined adjustment of the pressure under which the reaction is conducted, the reaction vessel may be maintained at any temperature desired corresponding to the boiling point of the diluent under the pressure imposed. If desired, another solvent, preferably inert and higher boiling, may be used as a diluent, in addition to the lower boiling refrigerant which serves as an internal refrigerating means, as indicated above.

If desired, the diluent containing the catalytic material, that is to say, the active halide dissolved in carbon disulfide, may be maintained within the reaction vessel and the liquefied olefin may be introduced in such a way that a relatively small amount of the olefin is continually added to a large amount of the diluent.

When the reaction has reached the desired stage water, or alkaline solution, or hydroxy substances such as methyl, ethyl or propyl alcohol or the various ethyl amines or liquid ammonia may be added to the mixture to quench the catalytic material and convert it into hydrolytic or other inert metathetical reaction products. In making the simple olefinic polymer, naphtha or other solvent may be added, if it has not been present originally, in order to dissolve the polymer and the whole mixture may be filtered to remove the solid hydrolyzation products and the catalyst. The naphtha and carbon disulfide may then be removed by distillation in order to recover the polymer in its pure state.

*Example 1*

As an example of the operation of the present process, the catalyst was prepared by dissolving about 20 grams of anhydrous aluminum bromide in 200 cc. of carbon disulfide. 10 cc. of liquefied isobutylene (93% purity) was then mixed with an approximately equal volume of liquefied ethylene to cool this mixture to about $-95°$ C. To this solution 0.20 cc. of the catalytic solution was added and a rapid reaction ensued, but the temperature was maintained at approximately $-95°$ C. by the rapid evaporation of a part of the ethylene, sufficient thereof being present for this purpose.

The reaction was complete in about three minutes after which the temperature was allowed to rise to room temperature, whereupon 50 cc. of isopropyl alcohol was added to destroy the catalyst. The polymer mixture was then taken up in heavy naphtha, washed with water, and filtered through filter paper. The filtrate was perfectly clear.

To 100 cc. of naphtha solution 300 cc. of alcohol was added which caused the precipitation of the polymerized olefins. On separation of this polymer and steaming to remove lower molecular weight materials, a solid product was obtained which had a molecular weight of 80,000 as measured by Staudinger's viscosity method.

While no stable, isolatable complex of the active halide catalyst with the solvent carbon disulfide could be found, the method of preparing the solution appears to influence markedly the amount of dissolved catalyst. Thus, carbon disulfide was stirred with an excess of aluminum chloride for 80 minutes at room temperature and was found to dissolve 0.019 gram of aluminum chloride per 100 cc. of carbon disulfide. In contrast, carbon disulfide was refluxed with an excess of solid aluminum chloride at the boiling point of carbon disulfide, 46.2° C., and was found to dissolve 0.12 gram of aluminum chloride per 100 cc. of carbon disulfide. Upon cooling to room temperature, aluminum chloride crystallized out from the solution but the recrystallization was slow. Upon cooling the saturated solution from the refluxing operation to a temperature of $-78°$ C. for a time of 12 minutes, a considerable quantity of solid aluminum chloride was crystallized out, but 0.033 gram of aluminum chloride per 100 cc. of carbon disulfide was retained in solution. However, this crystallization was also relatively slow. By cooling the solution more rapidly a higher concentration of AlCl₃ can be obtained. A similar solution of aluminum chloride in carbon disulfide was prepared by adding an excess of the solid aluminum chloride to the carbon disulfide and allowing it to digest for a period of 1 hour with occasional heating of the mixture nearly to the boiling point of the carbon disulfide. A solution nearly saturated with aluminum chloride was thereby obtained.

*Example 2*

A mixture consisting of 200 parts of liquid ethylene, 80 parts of liquid isobutylene and 20 parts of liquid butadiene was prepared and the mixture was then treated with 100 parts of catalyst solution prepared by saturating carbon disulfide at room temperature with aluminum chloride, the solution as prepared at room temperature, being added without preliminary cooling. The polymerization reaction occurred at moderate but satisfactory speed, and the resulting polymer was found to have a fairly high molecular weight, approximately 60,000, and to have an amount of unsaturation shown by an iodine number of 4.5, which indicated that the polymer was made up of approximately 99 isobutylene molecules to 1 butadiene molecule. The polymer so obtained was washed and compounded on the open mill according to the following formula:

|  | Parts |
|---|---|
| Interpolymer | 100 |
| Sulfur | 2.5 |
| Stearic acid | 2.5 |
| Zinc oxide | 5 |
| Tuads (tetramethyl thiuram disulfide) | 1 |

This compound was vulcanized for a period of 30 minutes at a temperature of 155° C. and a fully cured, unblistered product was obtained which showed a tensile strength of 2,200 lbs. per square inch and an elongation at the elastic limit of 1150%. The fact that an unblistered cure was obtained without the severe working in a Banbury mill and without solvent extraction or solution and reprecipitation, shows that a uniformly high molecular weight in all of the polymer molecules was obtained.

Aluminum bromide is equally effective as a polymerization catalyst, and it is relatively much more soluble in carbon disulfide.

*Example 3*

A mixture of 100 cc. of carbon disulfide with 1.6 grams of aluminum bromide was prepared, and allowed to stand for a period of approximately 1 hour with frequent heatings on a steam bath nearly to the boiling temperature of carbon disulfide. All of the solid aluminum bromide was dissolved. A mixture was then prepared consisting of 2000 parts of liquid ethylene, 800 parts of isobutylene and 200 parts of butadiene. The catalyst solution was quickly cooled to −78° C. by the application thereto of solid carbon dioxide, and a fine spray of the catalyst solution was applied intermittently to the surface of the rapidly stirred olefinic mixture for a period of approximately 5 minutes, during which time approximately 75 parts of the catalyst solution were used. The polymerization reaction started promptly and continued at a satisfactory speed. At the close of the 5 minutes, the polymerization reaction was quenched by the application to the mixture of approximately 500 parts of isopropyl alcohol. The solid polymer was then removed from the reaction vessel and washed and dried to remove the residual traces of reactants, alcohol, and catalyst decomposition products. The interpolymer or copolymer was then found to have a molecular weight of 24,000, and an iodine number of 6.75, indicating that there were approximately 1.5 butadiene molecules per 100 C₄ molecule units in the polymer. This material also was compounded according to the formula set out in Example 2, and was found to have a fairly high tensile strength and a similarly high elastic limit.

*Example 4*

A mixture of 2 liters of ethylene was prepared with 1 liter of isobutylene, and the catalyst solution prepared as in Example 3 was sprayed over the surface of the olefinic mixture for a period of 2 minutes. The resulting simple isobutylene polymer had a molecular weight of 68,000.

*Example 5*

A mixture of 75 cc. of methyl chloride was prepared with 75 cc. of butadiene at the boiling temperature of methyl chloride at approximately −23.7° C. To this mixture there was then added approximately 15 cc. of a catalyst solution of aluminum bromide in carbon disulfide prepared as above described. A very vigorous reaction resulted and a solid polymer of butadiene was formed.

Thus, as above disclosed, the process of the invention consists in the preparation of a solution of an active halide catalyst in carbon disulfide, and the polymerization of olefinic materials by the application of the catalyst solution thereto at reduced temperatures ranging from −10° C. to temperatures of −100° C. or about −112° C. at which carbon disulfide freezes, although in some instances temperatures below the freezing point of carbon disulfide may be used, especially when the catalyst is applied to the surface of the cooled reaction mixture in the form of a fine spray to utilize to the utmost such solubility of the solid carbon disulfide solution in the olefinic reactants. Similarly, the invention is applicable to the simple olefins, to the simple iso-olefins, to the simple diolefins and to mixtures of the simple olefins and diolefins.

While there are above desclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In the polymerization of unsaturated hydrocarbon isoolefinic materials having 4 to 7 inclusive carbon atoms with a Friedel-Crafts catalyst, the improvement comprising conducting the polymerization at temperatures below −10° C. while the catalyst is dissolved in carbon disulfide.

2. Process for producing a high molecular weight polymer comprising polymerizing an isoolefin having 4 to 7 inclusive carbon atoms at a temperature below −10° C., in the presence of a Friedel-Crafts catalyst dissolved in carbon disulfide.

3. Process for producing hydrocarbon polymers of high molecular weight, comprising polymerizing liquefied isobutylene at temperatures below −10° C. by means of a Friedel-Crafts catalyst dissolved in carbon disulfide.

4. Process for the polymerization of isobutylene to high molecular weights at temperatures below −10° C. including the step of utilizing an active halide Friedel-Crafts catalyst which is difficultly soluble in the liquefied polymerizable olefin, the catalyst being in solution in carbon disulphide in which the reaction is conducted in the presence of a liquefied hydrocarbon gas refrigerant in which the catalyst is difficultly soluble.

5. Process for polymerizing isobutylene to high molecular weights comprising conducting the reaction at a temperature below −10° C. with an aluminum halide catalyst dissolved in carbon disulfide.

6. Process according to claim 5 in which the catalyst comprises aluminum chloride dissolved in carbon disulfide.

7. Process according to claim 5 in which the catalyst comprises aluminum bromide dissolved in carbon disulfide.

8. Process according to claim 5 in which the catalyst comprises aluminum iodide dissolved in carbon disulfide.

9. In the polymerization of mixed iso-olefinic hydrocarbon materials comprising an iso-olefin having 4 to 7 inclusive carbon atoms with a Friedel-Crafts catalyst, the improvement comprising conducting the polymerization at temperatures below −10° C. while the catalyst is dissolved in carbon disulfide.

10. In the polymerization of mixtures of iso-olefinic and diolefinic hydrocarbons having 4 to 6 inclusive carbon atoms with a Friedel-Crafts catalyst, the improvement comprising conducting the polymerization at temperatures below −10° C. while the catalyst is dissolved in carbon disulfide.

11. In the polymerization of mixtures of isobutylene and a diolefin having 4 to 6 inclusive carbon atoms with a Friedel-Crafts catalyst, the improvement comprising conducting the polymerization at temperatures below −10° C. while the catalyst is dissolved in carbon disulfide.

12. In the polymerization of mixtures of isobutylene and butadiene with a Friedel-Crafts catalyst, the improvement comprising conducting the polymerization at temperatures below −10° C. while the catalyst is dissolved in carbon disulfide.

13. In the polymerization of mixtures of isobutylene and dimethyl butadiene with a Friedel-Crafts catalyst, the improvement comprising conducting the polymerization at temperatures below −10° C. while the catalyst is dissolved in carbon disulfide.

14. In the polymerization of mixtures of isobutylene and isoprene with a Friedel-Crafts catalyst, the improvement comprising conducting the polymerization at temperatures below −10° C. while the catalyst is dissolved in carbon disulfide.

15. A process for producing a high molecular weight polymer, comprising the step of polymerizing a mixture of a major proportion of an iso-olefin having 4 to 7 carbon atoms, inclusive, and a diolefin having 4 to 6 carbon atoms, inclusive at a temperature below −10° C. in the presence of a Friedel-Crafts catalyst dissolved in carbon disulfide.

16. A process for producing a high molecular weight polymer, comprising the step of polymerizing a mixture of a major proportion of an iso-olefin having 4 to 7 carbon atoms, inclusive, and a minor proportion of a diolefin having 4 to 6 carbon atoms, inclusive, at a temperature below −10° C. in the presence of aluminum chloride dissolved in carbon disulfide.

17. A process for producing a high molecular weight polymer, comprising the step of polymerizing a mixture of a major proportion of isobutylene and a minor proportion of a diolefin having 4 to 6 carbon atoms, inclusive, at a temperature below −10° C. in the presence of a Friedel-Crafts catalyst dissolved in carbon disulfide.

18. A process for producing a high molecular weight polymer, comprising the step of polymerizing a mixture of a major proportion of isobutylene and a minor proportion of a diolefin having 4 to 6 carbon atoms, inclusive, at a temperature below −10° C. in the presence of aluminum chloride dissolved in carbon disulfide.

19. A process for producing a high molecular weight polymer, comprising the step of polymerizing a mixture of a major proportion of isobutylene and a minor proportion of a conjugated diolefin having 4 to 6 carbon atoms, inclusive, at a temperature below −10° C. in the presence of aluminum chloride dissolved in carbon disulfide.

20. A process for producing a high molecular weight polymer, comprising the step of polymerizing a mixture of isobutylene and a conjugated diolefin of from 4 to 7 carbon atoms at a temperature below −10° C. in the presence of aluminum chloride dissolved in carbon disulfide.

WILLIAM J. SPARKS.
ROBERT M. THOMAS.